(12) United States Patent
Fajardo Verano et al.

(10) Patent No.: US 9,798,875 B2
(45) Date of Patent: Oct. 24, 2017

(54) SYSTEMS AND METHODS FOR DETECTING AND ADDRESSING HTML-MODIFYING MALWARE

(71) Applicant: Easy Solutions Enterprises Corp., Sunsrise, FL (US)

(72) Inventors: Ivan Dario Fajardo Verano, Bogota (CO); Claudio Deiro, Bogota (CO); Javier Fernando Vargas Gonzalez, Bogota D.C. (CO)

(73) Assignee: EASY SOLUTIONS ENTERPRISES CORP., Sunsrise, FL (US)

(*) Notice: Subject to any disclaimer, the term of this patent is extended or adjusted under 35 U.S.C. 154(b) by 0 days.

(21) Appl. No.: 14/716,684

(22) Filed: May 19, 2015

(65) Prior Publication Data

US 2016/0226900 A1 Aug. 4, 2016

Related U.S. Application Data

(60) Provisional application No. 62/111,560, filed on Feb. 3, 2015.

(51) Int. Cl.
*H04L 29/06* (2006.01)
*G06F 21/55* (2013.01)
*G06F 21/56* (2013.01)

(52) U.S. Cl.
CPC ............ *G06F 21/55* (2013.01); *G06F 21/562* (2013.01); *H04L 63/145* (2013.01)

(58) Field of Classification Search
CPC .................................................. H04L 63/1483
See application file for complete search history.

(56) References Cited

U.S. PATENT DOCUMENTS

| | | | |
|---|---|---|---|
| 8,752,183 B1* | 6/2014 | Heiderich | G06F 21/577 726/22 |
| 9,356,941 B1* | 5/2016 | Kislyuk | H04L 63/14 |
| 2008/0162268 A1* | 7/2008 | Gilbert | G06Q 10/06375 705/7.29 |
| 2009/0281989 A1* | 11/2009 | Shukla | G06F 17/30893 |
| 2010/0106568 A1* | 4/2010 | Grimes | G06Q 30/02 705/14.1 |
| 2010/0217777 A1* | 8/2010 | Kussmaul | G06F 17/30873 707/776 |
| 2014/0283067 A1* | 9/2014 | Call | H04L 63/1425 726/23 |
| 2014/0283068 A1* | 9/2014 | Call | H04L 63/1425 726/23 |
| 2015/0112892 A1* | 4/2015 | Kaminsky | G06N 7/00 706/11 |

FOREIGN PATENT DOCUMENTS

CN 103581162 A * 2/2014
KR 100622129 B1 * 9/2006

* cited by examiner

*Primary Examiner* — Jeffery Williams
(74) *Attorney, Agent, or Firm* — Greenberg Traurig, LLP

(57) ABSTRACT

Among other things, embodiments of the present disclosure help provide entities with the ability to remotely detect behavior associated with malware and identify compromised user-sessions, regardless of the malware variant or family, and independently of the page structure.

19 Claims, 6 Drawing Sheets

SYSTEMS AND METHODS FOR DETECTING AND ADDRESSING HTML-MODIFYING MALWARE

CROSS-REFERENCE TO RELATED APPLICATION

This application claims priority to U.S. Provisional Patent Application No. 62/111,560, filed Feb. 3, 2015 and entitled "DETECTING FRAUD DRIVEN BY HTML-MODIFYING MALWARE," the content of which is incorporated by reference in its entirety.

BACKGROUND

As the use of computing devices, software, and the Internet expands, threats from Malicious software, also referred to as "malware," increases as well. Such malware can be used, for example, to take control of some or all of a computing device's functionality, to collect otherwise-sensitive or private information, and to spread malware to other devices. Malware can thus be used in conjunction with criminal activities such as fraud (e.g., identity theft), corporate espionage, and other illicit activities.

One form of malware, HTML-modifying malware, performs illicit modifications to web pages. Embodiments of the present disclosure help detect such modifications, as well as addressing other issues.

SUMMARY

Among other things, embodiments of the present disclosure help provide entities with the ability to remotely detect behavior associated with malware and identify compromised user-sessions, regardless of the malware variant or family, and independently of the page structure.

Exemplary embodiments of the present disclosure include a server that hosts a web page and is configured to determine if the page displayed by a remote web browser contains malware-related modifications. Additionally, if a malicious modifying-element is found, embodiments of the disclosure can create an accurate representation of the modified page in order to support forensic processes and impact mitigation procedures.

A computer-implemented method according to various aspects of the present disclosure includes: transmitting, by a server computing device to a client computing device over a network, a code module for collecting and transmitting data related to a web page presented on the client computing device; receiving, by the server computing device, the data related to the web page presented on the client computing device, wherein the data related to the web page is received over the network via the code module operating on the client computing device; analyzing, by the server computing device, the data related to the web page, wherein analyzing the data related to the web page includes comparing the data to one or more of: one or more patterns associated with non-modified web page states; one or more patterns associated with malicious web page states; and one or more patterns associated with innocuous web page modifications; and in response to the analysis, generating a risk factor associated with the web page.

The present disclosure includes various methods, apparatuses (including computer systems) that perform such methods, and computer readable media containing instructions that, when executed by computing systems, cause the computing systems to perform such methods.

Other features will be apparent from the accompanying drawings and from the detailed description which follows.

DETAILED DESCRIPTION

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

In the accompanying drawings, some features may be exaggerated to show details of particular components (and any size, material and similar details shown in the figures are intended to be illustrative and not restrictive). Therefore, specific structural and functional details disclosed herein are not to be interpreted as limiting, but merely as a representative basis for teaching one skilled in the art to variously employ the disclosed embodiments.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Any combination and/or subset of the elements of the methods depicted herein may be combined with each other, selectively performed or not performed based on various conditions, repeated any desired number of times, and practiced in any suitable order and in conjunction with any suitable system, device, and/or process. The methods described and depicted herein can be implemented in any suitable manner, such as through software operating on one or more computer systems. The software may comprise computer-readable instructions stored in a tangible computer-readable medium (such as the memory of a computer system) and can be executed by one or more processors to perform the methods of various embodiments.

Figure 1:
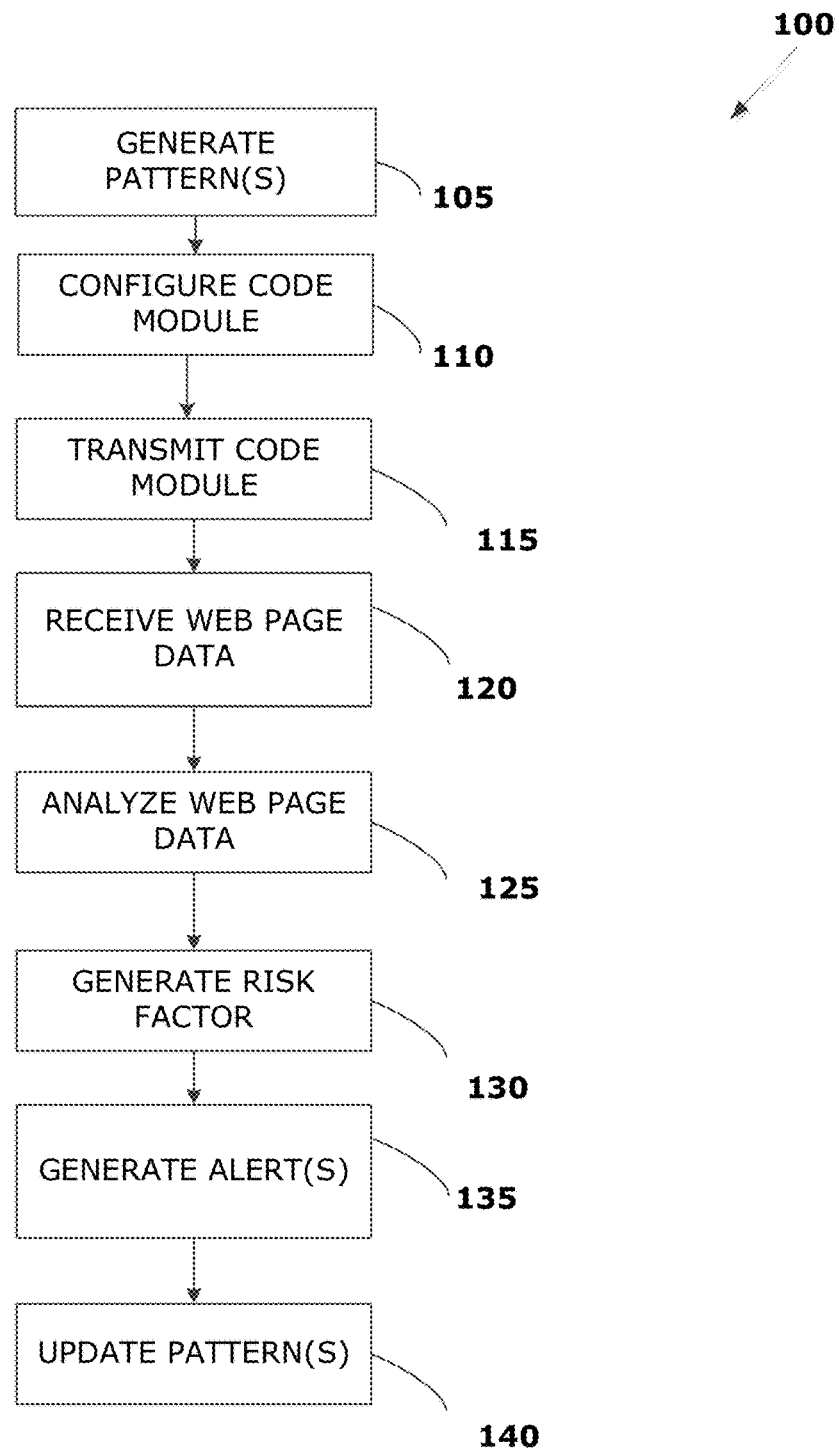
FIG. 1 is an exemplary method according to various aspects of the present disclosure.

FIG. 1 illustrates an exemplary method according to various aspects of the present disclosure. The steps of method 100 may be performed by any suitable computing device, such as by server computing device 610 depicted in FIG. 6. In this example, method 100 includes generating one or more patterns associated with web pages (105), configuring a code module for collecting and transmitting data related to a web page (110), transmitting the code module to a client computing device (115), receiving web page data from the code module (120), analyzing the web page data (125), generating a risk factor based on the analysis (130), generating one or more alerts (135), and updating one or more patterns associated with web pages (140).

Embodiments of the present disclosure may generate (105) a variety of different patterns associated with various web page states to help identify a malicious (or potentially malicious) modification to a web page.

In one exemplary embodiment, the remote access server (RAS) apparatus includes three static knowledge bases and a dynamic risk-assessment algorithm. Other knowledge bases and algorithms may also be utilized in conjunction with embodiments of the present disclosure. In this example, the static knowledge bases include a "known-to-be-good" list, a "known-to-be-malicious" list and a "known-to-be-innocuous" list. These lists are discussed in more detail with reference to analyzing the web page data (step 125).

In some exemplary embodiments, the static knowledge bases may be configured during a training/setup phase. In some cases, the system may assume that a site to be protected is being browsed only from secured stations, and hence it can put into the "known-to-be-good" list all the unknown states coming from the code module. To avoid problems with this assumption, some training machines may be configured to send specially crafted hypertext transfer protocol (HTTP) headers when browsing the protected portal. In Addition to such headers, the RAS may also have a list of IP addresses where training machines can communicate from. This way, if an unknown state arrives to the RAS and the state-report contains the adequate HTTP headers and comes from the expected IP address, the RAS includes this new state into the "known-to-be-good" list.

During operation, when a session that has been identified as potentially risky (e.g., by the system, operator, third party actor, etc.), the system may classify the page as described in more detail below (e.g., "Page OK," "Page Modified by a Malicious Element," "Page Modified by an Inoffensive Element"). The system can then generate a pattern associated with each type of classification in the static knowledge bases. This enables the system to accurately identify the next session that matches the new pattern, independently of the list where it was finally inserted. Additionally, in order to improve its accuracy, the "risk assessment algorithm" can be trained periodically including all the data contained in the lists.

A code module may be configured (110) and transmitted (115) to a client computing device to collect data related to a web page presented on the computing device. In some exemplary embodiments, a web server may automatically configure a code module comprising a set of code (e.g., written in JAVASCRIPT or another language), embed the code module in a Hypertext Markup Language (HTML) web page, and provide the web page and code module to the client computing device, in response, for example, to a user of the client computing device visiting a web portal hosted by the web server.

In other embodiments, the code module may be embedded into a web page by a server or other computing device other than the web server. For example, a loader module comprising a small snippet of code may be inserted into the web page by the web server hosting the web page or another device. The loader module may perform various configuration actions (such as setting page-identifier variables), loads the code module from a server (e.g., possibly a different server from the web server), and embeds the code module in the web page.

The code module is configured to collect data related to the web page to be used in the detection of malware-related modifications. In one embodiment, the code module waits until the page if fully rendered by the browser before starting collection of the data.

Figure 2:
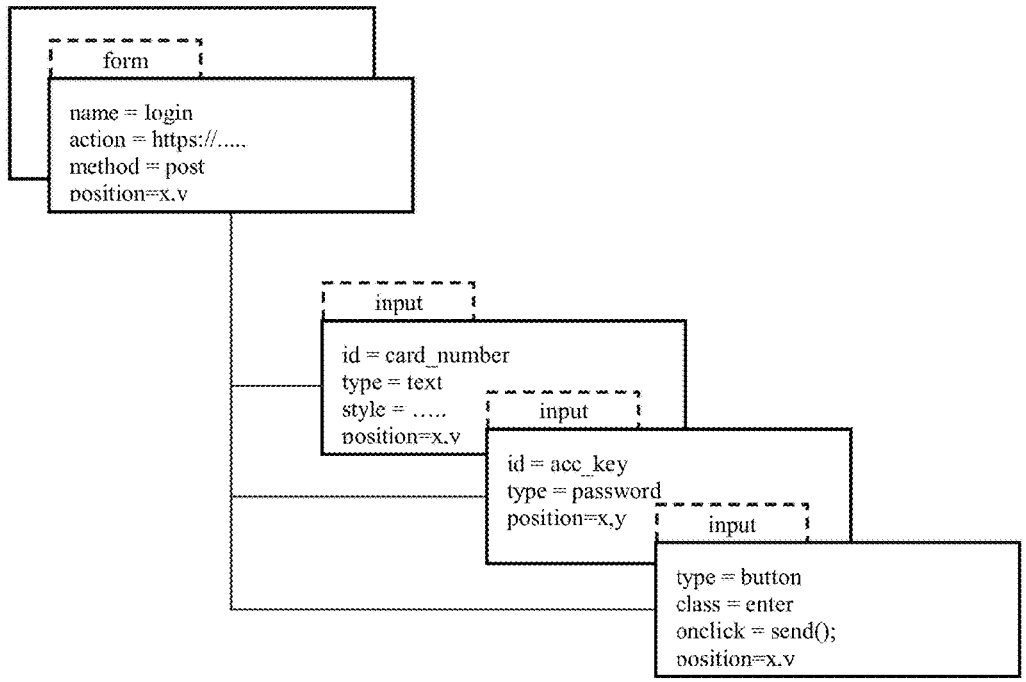
FIG. 2 is a graphical illustration showing how HTML from a web page may be scanned by a code module and translated into a set of data according to various aspects of this disclosure.

FIG. 2 illustrates how a portion of HTML from a web page may be scanned by the code module and translated into a set of data (in a data structure) that can be converted to JSON or any other exchanging data format and sent to the RAS.

Embodiments of the present disclosure may be configured to collect information about specific elements. Those elements may be chosen according to the kind of attacks the system seeks to detect and address. For example, if the system is focused on preventing HTML injections intended to steal credentials or sensible data (as shown in FIG. 2), the system collects information on elements that can potentially be used to ask the user for additional data such inputs, text fields or any kind editable element. Additionally, in order to have a better insight of the current page structure, embodiments of the disclosure may include all the elements that act as containers of the editing elements found in the page. In the example shown in FIG. 2, a form containing three input elements is mapped to a representation in the form of a tree structure containing the details of input fields nested inside the details of a form element. Similarly, an embodiment seeking to detect the addition of data intended to modify the page structure dynamically, can include script (e.g., JAVASCRIPT) tags to the set of collected elements. Any set of elements may be selected for monitoring based on any desired criteria, and such elements being monitored may be dynamically modified during the operation of the system.

In various embodiments, as shown in FIG. 2, a set of data related to a web page is collected by the code module and transmitted to a Risk Analysis Server (RAS), where further verifications are performed in order to determine the presence of malware-related modifications. The functionality of the RAS may be performed by the server computing device 610 depicted in FIG. 6, as well as by other suitable computing devices in communication with the client computing device upon which the code module is running.

Any desired web page data may be collected by the code module. For example, the code module may be configured to collect data on any feature of the web page that can potentially be used to modify the page structure, and consequently, to potentially lure the user of the client computing device to disclose sensitive information that would not have been asked for by the unmodified web page. Data related to the web page collected by the code module may include, for example, one or more: identifiers, styling details, nesting details, locations of features within the web page (e.g., inside the HTML tree), elements that request a user of the client computing device to enter data, and/or script elements (e.g., in JAVASCRIPT).

The data related to the web page is received (120) from the code module by the RAS or another system implementing the functionality of the embodiments of the present disclosure, and such data may be transmitted to the RAS in any desired manner. For example, the data related to the web page may be packaged as a JAVASCRIPT Object Notation (JSON) document (or any other exchanging data format).

Embodiments of the present disclosure can collect data related to the web page that enables the RAS to get full insight of the actual state of the web page by, for example, detailing Document Object Model (DOM) elements, the structure of the web page, and the content of any scripts operating on the web page, without having to send the entire HTML document implementing the web page. Among other things, including only a subset of the total elements present in the web page (e.g., those most useful in identifying malicious modifications to the page) helps avoid network overload and helps keep the responsiveness of the webportal relatively unaffected by the embodiments of this disclosure. This latter feature also helps embodiments of the present disclosure provide effective protection while keeping the user experience relatively unaltered.

The web page data may be analyzed (125) to identify known patterns in the web page data that are known to be indicative of non-modified states, malicious modifications, innocuous modifications, or other cases. Continuing the example described above with reference to step 105, embodiments of the present disclosure may compare the data associated with the web page to various lists of patterns, such as the "known-to-be-good" list, "known-to-be-malicious" list and "known-to-be-innocuous" list introduced above.

The known-to-be-good list holds a set of patterns associated with states of the page identified as not modified states. This set of states may be learned by the system during the training phase and along the operation lifecycle. Feature sets of data related to a web page may be analyzed using different lists of patterns in any desired manner In one exemplary embodiment, a feature-set may first be analyzed against the "known-to-be-good" list in order to check if it matches with any of the stored states. If a match is found, the session is marked as not risky and no further analysis is performed. If at least one feature in the data is not on the "known-to-be-good" list, however, further analysis may be performed.

The "known-to-be-malicious list" contains a set of patterns that constitutes the base of known attacks that the system learns through its operational lifecycle. The patterns contained in this list provide the system with the capability to quickly identify already known attacks and classify them as associated with a specific malware variant or campaign. If a feature-set contained in web page data collected by the code module is found to match a pattern contained in this list, the web page may be automatically marked as risky and no further analysis performed. Alternatively, the system may engage in additional analysis to, for example, identify additional threats in the page, the possible source of one or more threats, and other information. Among other things, such additional analysis may be used to better update the pattern lists of the embodiments of the present disclosure, as well as to provide useful information to web hosts and law enforcement regarding malicious web page modifications the system detects.

The "known-to-be-innocuous" list may be used to identify patterns that indicate a web page has been modified, but not in a manner that is malicious. Such modifications may include, for example, browser plugins that modify the page DOM to include a graphical user interface (GUI) but do not pose a threat. In some exemplary embodiments, the RAS attempts to determine if the analyzed features have content matching any pattern in the "known-to-be-innocuous" list. If a match is found, then the RAS checks whether, after removing the matching content from the features, there is a close matching with at least one of the entries from the known-to-be-good list. If this latter test ends with a match, the session may be marked as safe and no further analysis is needed. Otherwise, the system may perform a risk-assessment algorithm, as described in more detail below. In some embodiments, a risk-assessment algorithm is only performed in response to a determination, by analyzing the data related to the web page, that one or more elements in the web page data do not correspond to any pattern in at least of the static lists available to the system. Among other things, this allows the system to identify potentially new patterns that can be added to the static lists.

Embodiments of the present disclosure may perform any desired analysis in order to identify patterns of groups of elements, and structures inside the compared element features, within the data related to a web page. The representation of such patterns may be diverse, and utilize (for example) a variety of XML pattern matching techniques, such as XPATH.

The patterns contained in the static knowledge bases described previously may comprise data structures which may be similar to the data structures collected by the code module on the client computing device. The data structures may provide a simplified version of a page features document, which include a subset of the elements and details of particular interest for the given list.

Figure 3:
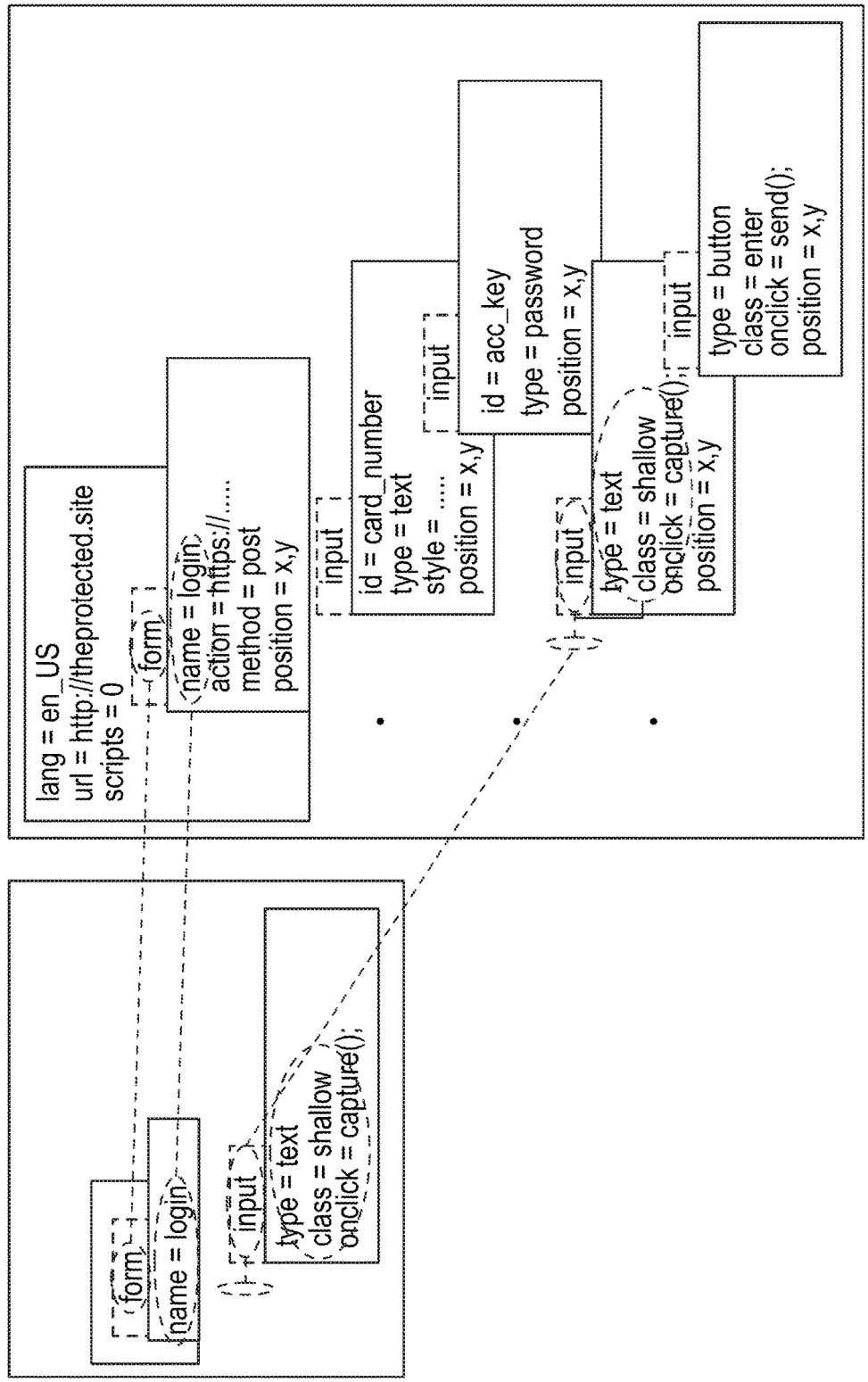
FIGS. 3 and 4 are graphical illustrations of pattern matching according to various aspects of this disclosure.
Figure 4:
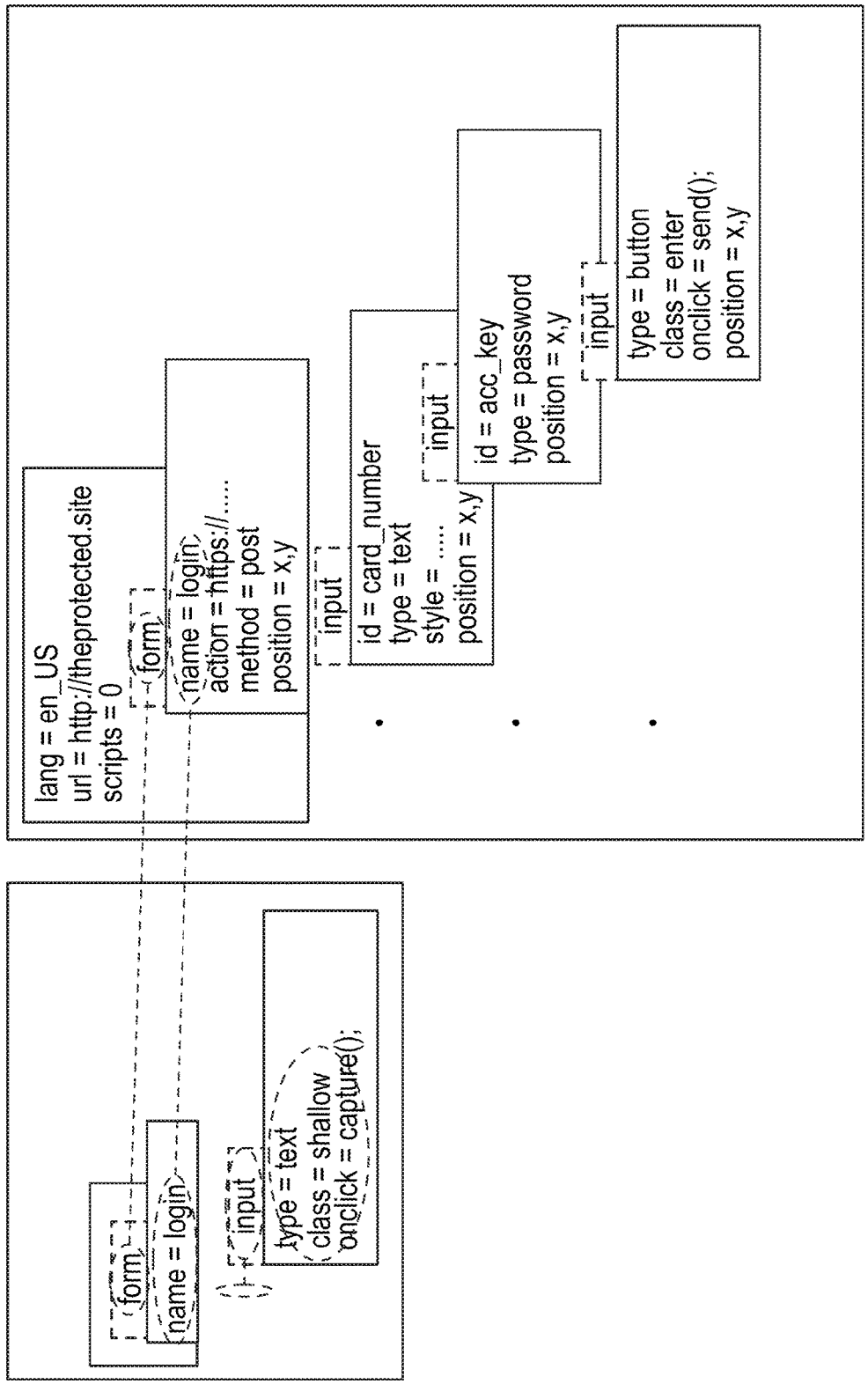

When looking for a match, if the compared feature set contains all the elements and structure detailed in the pattern, it may be said that it matches the pattern, even if the compared feature contains more elements than the matched pattern. FIG. 3 illustrates a graphical example of a match against a pattern. In this example, the pattern (in the left box) is found in the data retrieved from the web page (in the right box). FIG. 4, by contrast, illustrates an example where no match is found, as the lower portion of the pattern in the left box is not present in the data retrieved from the web page (right box).

In some embodiments, the analysis of the web page data (125) may conclude in response to correlating the web page data with patterns in the static lists. If such analysis does not produce a conclusive result (e.g., because one or more elements in the web page data are not found in any of the lists), additional analysis may be performed in order to determine whether the web page has (or is at risk of having) a malicious modification. In some exemplary embodiments, the features in the web page data can be further analyzed using a risk-assessment algorithm in order to generate a risk factor (130). In various embodiments, the risk-assessment algorithm may be automatically adjusted based on the history of incidents related to HTML-modifying malware detected by the system. In this manner, embodiments of the present disclosure automatically improve their effectiveness of the system and learn from previously-detected threats without necessitating user intervention to identify such threats.

Figure 5:
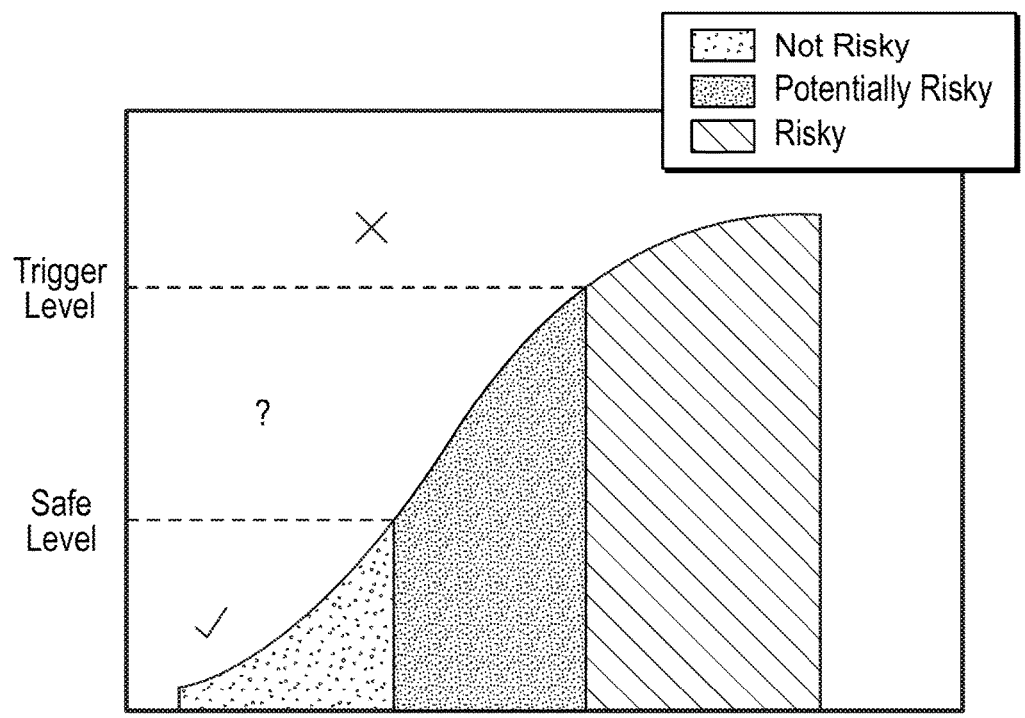
FIG. 5 is an exemplary risk assessment graph according to various aspects of the present disclosure.

In some embodiments, the factors that determine the risk-level of a given feature-set may be dictated by the history of the system. For example, the more malware-related modifying-elements the features include, the higher the risk assigned to the session. In order to assets the risk-level of a session, a risk factor map maybe defined so that sessions with risk-level below a given safe-level are discarded as not risky, and risk-levels above a trigger value are automatically marked as risky, as shown in the graph in FIG. 5.

In this example, when the risk-level is not below or above the given limits in the graph, the session may be marked as potentially risky and external intervention may be required in order to conclude the nature of the modification performed to the web page. Once the riskiness of the session has been determined, that feedback may be included to the system's knowledge base and used by all future analyses of web page data.

In various embodiments, the risk assessment algorithm may comprise a prediction algorithm implementing a function that discriminates between risky and not risky modifications, giving as an output a number indicating the probability that a given feature-set contains harmful modifications.

In various embodiments, the risk assessment algorithm is updated to reflect the system history. That is, it is re-parameterized periodically such that its final output assigns a greater riskiness to those page-modifications containing elements or variations typically included in malware modifications found over the system history.

As an illustrative example, consider that for a given page the system has positively identified a set of malware injections in the following HTML code, with the bold-face sections being indicators of fields added to the original structure:

```
...
<form name="login" action="https://services.location/path"
method="post">
    ...
    <label for="atm_pin ">ATM Pin</label>
    <input id=" atm_pin " type="password">
    ...
</form>
...
<form name="otp_sync"
action="https://services.location/fakepath" method="post">
    ...
    <label for=" otp_number ">OTP Number</label>
    <input id=" otp_number " type="text">
    ...
</form>
...
<form name="login" action="https://services.location/path"
method="post">
    ...
    <label for="creditcard ">ATM Pin</label>
    <input id="creditcard" type="text">
    <label for="cvc ">CVC Number</label>
    <input id="cvc" type="password">
    ...
</form>
```

In some cases, for a feature-set which difference with its closest known-to-be-good pattern includes elements of type input, chances are that such page is being modified by a malicious agent. Furthermore, if the difference includes not only input elements but input elements with type password, the likelihood of being a malicious will be much higher than the previous situation.

Deciding the kind of observed variables to include as input for the classification algorithm can be obtained by empirical observation, as well as by using exploratory data analysis techniques. Once a determination is made as to the variables to observe when trying to determine the riskiness of a page, a determination is made as to the set of parameters that better fit for the chosen algorithm or function.

Some embodiments may include the content of the known-to-be-innocuous list, so that elements or variations typically included both in malicious and innocuous modifications trigger a lower risk-level than those included exclusively in malicious modifications.

As an example, an embodiment of the present disclosure may use the following sigmoid function as a prediction function:

$$y(v) = \frac{1}{1+e^{-v}}$$

Where v is the weighted sum of the difference of the observed variables between the analyzed page-feature and its closest pattern.

$$v = \sum_j w_j V_j$$

Where $V_j$ is the number of occurrences of each one of the observed variables.

The risk assessment algorithm may be tuned to fit the history of web page data analyzed by the system by finding the combination of $w_j$ that gives the best prediction.

Whenever as session is marked as risky or potentially risky, the code module may be instructed (e.g, by the RAS) to create a full snapshot of the state of the page so that it can be used to create an accurate representation of the page status. Such snapshot is intended to be used as visual evidence in forensic processes as well as to support the determination of the level of risk of a modification.

In one embodiment, when the code module creates the snapshot, it copies the entire HTML of the page and posts it to the RAS. The RAS in turn saves the HTML content and converts the page into an image that shows the visual aspects of the page.

In one exemplary embodiment, a script module is commanded by the RAS to take a snapshot of the page by making a copy of the current document object model (DOM) tree. The DOM copy is then prepared to be sent to the server by converting all the relative resources (URLs) to its absolute representation. If the page contains HTML "IFRAME" or "FRAME" elements and the cross-origin policies allow it, its content is also copied and prepared. The prepared data is sent to the RAS which finally queues it to be rendered by the rendering engine. The rendering engine is a headless (no GUI) browser which is used to render the DOM sent by the monitoring script. The output of the render engine is then stored and associated to the data of the incident so that the operator can see it when reviewing incident reports. The DOM sent by the monitoring script is also stored so that it can be used in forensic procedures to identify the portions of HTML injected by malware.

Embodiments of the present disclosure may generate various alerts (135) such as by posting usage reports and incident events whenever a risk has been found. Such reports and events can be used by an external agent/component to consolidate statistics and reports detailing the activity registered by the system. Additionally, incident reports can be used by the web portal owner in order to start mitigation procedures or to perform forensic operation.

In some cases, such as when a session is analyzed and its riskiness level is not conclusive, the session may be marked as potentially risky and an alert generated to a user of the system (or an external agent) to indicate additional analysis/intervention may be needed in order to help determine or evaluate the risk factor of the web page session.

Such alerts may be generated and provided to various users and systems in any suitable manner. For example, a human agent may be alerted with a notification that can be sent by any kind of communications method, such as an e-mail or a phone call to dedicated monitoring application. Once the agent decides to attend the incident, he/she may be presented with a set of elements/data intended to facilitate its work and guarantee the identification of any new attack campaign. Automated agents (e.g., controlled by software operating on other servers) may similarly be notified. Sets of elements provided to agents may include, for example:

Details of the Incident:

Such details may include some or all of the data that can be collected to determine when, where and how the incident happened. Such details may include, for example: URL, timestamp, remote IP Address, Browser Id/version, underlying OS, language, session id, incident id, detail of the headers used by the browser, etc.

Snapshot:

The snapshot, such as described previously, offers the agent the opportunity to view an accurate image of what the user of the client computing device was watching on his/her browser when the incident was detected. As stated previously, when an incident is found, the code module may be instructed to send all the data available that allows the system to build a good approximation of what is visible for the user in that precise instant. Among other things, this helps the agent to appreciate the visual differences between the modified and the original page.

HTML Content:

The same data used to generate the snapshot of the incident may also be made available to the agent so that he/she can examine in detail the elements that where altered on the page.

Once the external agent has determined the nature of the incident, the agent can acknowledge the system in various ways. The agent can also identify new patterns in order to update one or more patterns (140) in the static lists. Alternatively or in conjunction, embodiments of the present disclosure may also add new patterns to the static lists. Acknowledgements provided by an agent may include, for example:

Page OK:

This selection may be made when the agent determines that the session didn't contain any kind of modification. This may occur, for example, when the portal owner introduces changes to the protected page and the system hasn't yet encountered this new version of the page before. In this case, the system simply could add one or more patterns reflecting this new state to the known-to-be-good list.

Page Modified by a Malicious Element:

In this case, the agent determines that the page has been actually modified with malicious purposes. Together with this acknowledgment, the agent may provide a label identifying the modification. This label can be an identifier of the malware performing the injection, the name of the attack or any other meaningful text. The system may proceed to determine the modifying elements and to create a pattern to be included in the known-to-be-malicious list so that a match can be found in this list the next time the system analyzes data from a web page is being injected by the same malicious actor.

Page Modified by an Inoffensive Element:

In this case, the agent determines that the page has been modified, but the modification is not malicious. This may occur, for example, when the browser includes extensions/plugins intended to improve the user experience or to provide additional services while the user is browsing. The extracted pattern may be added to the known-to-be-innocuous list for future analyses.

In some embodiments, intervention by an external agent (whether human or another system) is logged so that the source of modifications to the static lists or risk analysis algorithm(s) can be traced.

Figure 6:
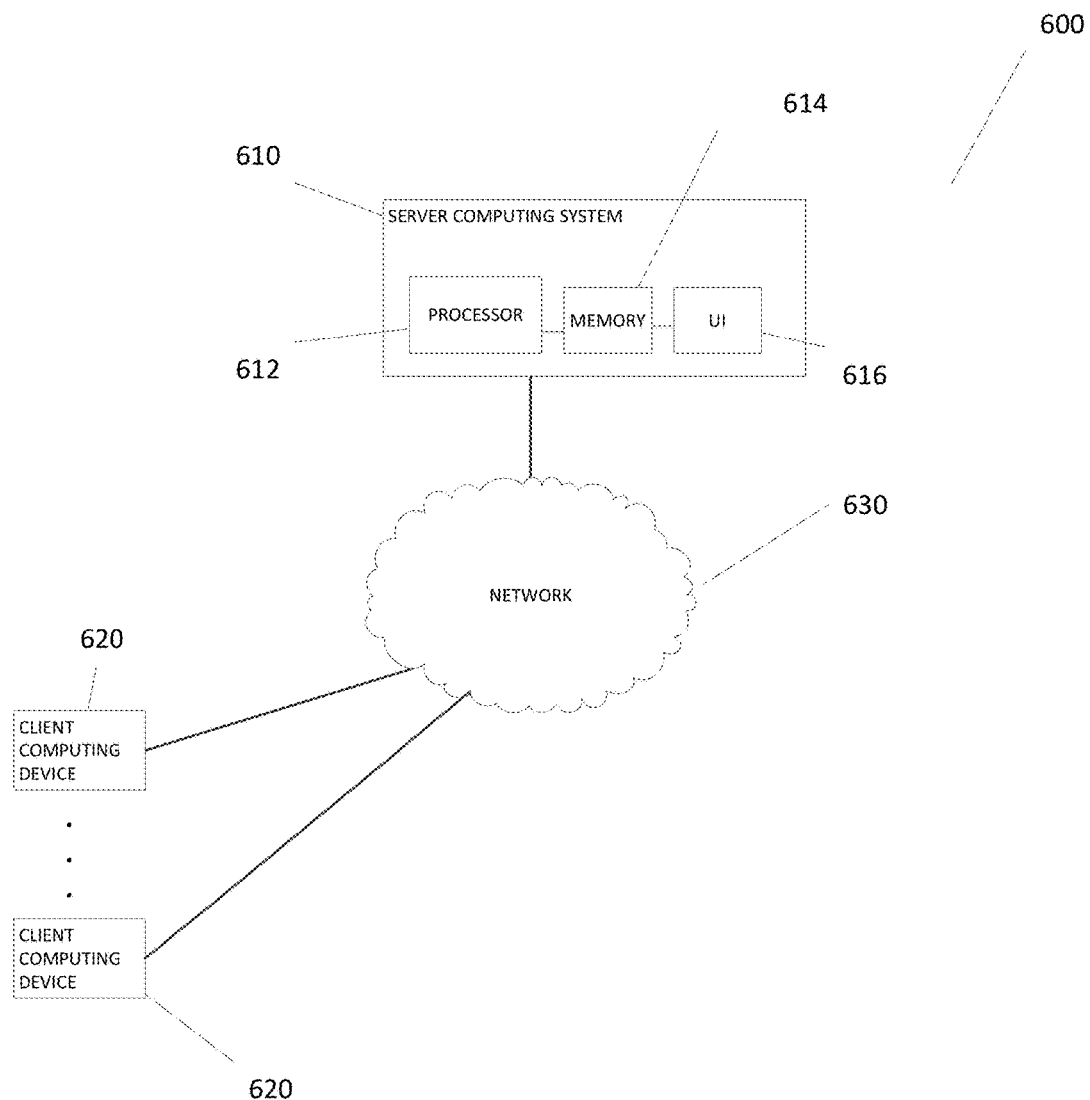
FIG. 6 is a block diagram of an exemplary system according to various aspects of the present disclosure.

FIG. 6 is a block diagram of system which may be used in conjunction with various embodiments. While FIG. 6 illustrates various components of a computer system, it is not intended to represent any particular architecture or manner of interconnecting the components. Other systems that have fewer or more components may also be used.

In FIG. 6, the system 600 includes a server computing system 610 comprising a processor 612, memory 614, and user interface 616. Computer system 610 may include any number of different processors, memory components, and user interface components, and may interact with any other desired systems and devices in conjunction with embodiments of the present disclosure.

The functionality of the computer system 610, including the steps of the methods described above (in whole or in part), may be implemented through the processor 612 executing computer-readable instructions stored in the memory 614 of the system 610. The memory 614 may store any computer-readable instructions and data, including software applications, applets, and embedded operating code. Portions of the functionality of the methods described herein may also be performed via software operating on one or more of the user computing devices 620.

The functionality of the system 610 or other system and devices operating in conjunction with embodiments of the present disclosure may also be implemented through various hardware components storing machine-readable instructions, such as application-specific integrated circuits (ASICs), field-programmable gate arrays (FPGAs) and/or complex programmable logic devices (CPLDs). Systems according to aspects of certain embodiments may operate in conjunction with any desired combination of software and/or hardware components. The processor 612 retrieves and executes instructions stored in the memory 614 to control the operation of the system 610. Any type of processor, such as an integrated circuit microprocessor, microcontroller, and/or digital signal processor (DSP), can be used in conjunction with embodiments of the present disclosure. A memory 614 operating in conjunction with embodiments of the disclosure may include any combination of different memory storage devices, such as hard drives, random access memory (RAM), read only memory (ROM), FLASH memory, or any other type of volatile and/or nonvolatile memory. Data can be stored in the memory 614 in any desired manner, such as in a relational database.

The system 610 includes a user interface 616 that may include any number of input devices (not shown) to receive commands, data, and other suitable input. The user interface 616 may also include any number of output devices (not shown) to provides the user with data, alerts/notifications, and other information. Typical I/O devices may include mice, keyboards, modems, network interfaces, printers, scanners, video cameras and other devices.

The system 610 may communicate with one or more client computing devices 620, as well as other systems and devices in any desired manner, including via network 630. The system 610 and/or client computing devices 620 may be, include, or operate in conjunction with, a laptop computer, a desktop computer, a mobile subscriber communication device, a mobile phone, a personal digital assistant (PDA), a tablet computer, an electronic book or book reader, a digital camera, a video camera, a video game console, and/or any other suitable computing device.

The network 630 may include any electronic communications system or method. Communication among components operating in conjunction with embodiments of the present disclosure may be performed using any suitable communication method, such as, for example, a telephone network, an extranet, an intranet, the Internet, point of interaction device (point of sale device, personal digital assistant (e.g., iPhone®, Palm Pilot®, Blackberry®), cellular phone, kiosk, etc.), online communications, satellite communications, off-line communications, wireless communications, transponder communications, local area network (LAN), wide area network (WAN), virtual private network (VPN), networked or linked devices, keyboard, mouse and/or any suitable communication or data input modality. Systems and devices of the present disclosure may utilize TCP/IP communications protocols as well as IPX, Appletalk, IP-6, NetBIOS, OSI, any tunneling protocol (e.g. IPsec, SSH), or any number of existing or future protocols.

Communication among systems, devices, and components operating in conjunction with embodiments of the present disclosure may be performed using any suitable communication method, such as, for example, a telephone network, an extranet, an intranet, the Internet, point of interaction device (point of sale device, personal digital assistant (e.g., iPhone®, Palm Pilot®, Blackberry®), cellular phone, kiosk, etc.), online communications, satellite communications, off-line communications, wireless communications, transponder communications, local area network (LAN), wide area network (WAN), virtual private network (VPN), networked or linked devices, keyboard, mouse and/or any suitable communication or data input modality. Systems and devices of the present disclosure may utilize TCP/IP communications protocols as well as IPX, Appletalk, IP-6, NetBIOS, OSI, any tunneling protocol (e.g. IPsec, SSH), or any number of existing or future protocols.

While some embodiments can be implemented in fully functioning computers and computer systems, various embodiments are capable of being distributed as a computing product in a variety of forms and are capable of being applied regardless of the particular type of machine or computer-readable media used to actually effect the distribution.

A machine readable medium can be used to store software and data which when executed by a data processing system causes the system to perform various methods. The executable software and data may be stored in various places including for example ROM, volatile RAM, non-volatile memory and/or cache. Portions of this software and/or data may be stored in any one of these storage devices. Further, the data and instructions can be obtained from centralized servers or peer to peer networks. Different portions of the data and instructions can be obtained from different centralized servers and/or peer to peer networks at different times and in different communication sessions or in a same communication session. The data and instructions can be obtained in entirety prior to the execution of the applications. Alternatively, portions of the data and instructions can be obtained dynamically, just in time, when needed for execution. Thus, it is not required that the data and instructions be on a machine readable medium in entirety at a particular instance of time.

Examples of computer-readable media include but are not limited to recordable and non-recordable type media such as volatile and non-volatile memory devices, read only memory (ROM), random access memory (RAM), flash memory devices, floppy and other removable disks, magnetic disk storage media, optical storage media (e.g., Compact Disk Read-Only Memory (CD ROMS), Digital Versatile Disks (DVDs), etc.), among others. The computer-readable media may store the instructions.

In various embodiments, hardwired circuitry may be used in combination with software instructions to implement the techniques. Thus, the techniques are neither limited to any specific combination of hardware circuitry and software nor to any particular source for the instructions executed by the data processing system.

Although some of the drawings illustrate a number of operations in a particular order, operations which are not order dependent may be reordered and other operations may be combined or broken out. While some reordering or other groupings are specifically mentioned, others will be apparent to those of ordinary skill in the art and so do not present an exhaustive list of alternatives. Moreover, it should be recognized that the stages could be implemented in hardware, firmware, software or any combination thereof.

For the sake of brevity, conventional data networking, application development and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical system.

The various system components discussed herein may include one or more of the following: a host server or other computing systems including a processor for processing digital data; a memory coupled to the processor for storing digital data; an input digitizer coupled to the processor for inputting digital data; an application program stored in the memory and accessible by the processor for directing processing of digital data by the processor; a display device coupled to the processor and memory for displaying information derived from digital data processed by the processor; and a plurality of databases. Various databases used herein may include: shipping data, package data, and/or any data useful in the operation of the system.

Various functionality may be performed via a web browser and/or application interfacing utilizing a web browser. Such browser applications may comprise Internet browsing software installed within a computing unit or a system to perform various functions. These computing units or systems may take the form of a computer or set of computers, and any type of computing device or systems may be used, including laptops, notebooks, tablets, hand held computers, personal digital assistants, set-top boxes, workstations, computer-servers, main frame computers, mini-computers, PC servers, network sets of computers, personal computers and tablet computers, such as iPads, iMACs, and MacBooks, kiosks, terminals, point of sale (POS) devices and/or terminals, televisions, or any other device capable of receiving data over a network. Various embodiments may utilize Microsoft Internet Explorer, Mozilla Firefox, Google Chrome, Apple Safari, Opera, or any other of the myriad software packages available for browsing the internet.

Various embodiments may operate in conjunction with any suitable operating system (e.g., Windows NT, 95/98/2000/CE/Mobile/, Windows 7/8, OS2, UNIX, Linux, Solaris, MacOS, PalmOS, etc.) as well as various conventional support software and drivers typically associated with computers. Various embodiments may include any suitable personal computer, network computer, workstation, personal digital assistant, cellular phone, smart phone, minicomputer, mainframe or the like. Embodiments may implement security protocols, such as Secure Sockets Layer (SSL), Transport Layer Security (TLS), and Secure Shell (SSH). Embodiments may implement any desired application layer protocol, including http, https, ftp, and sftp.

The various system components may be independently, separately or collectively suitably coupled to a network via data links which includes, for example, a connection to an Internet Service Provider (ISP) over the local loop as is typically used in connection with standard modem communication, cable modem, satellite networks, ISDN, Digital Subscriber Line (DSL), or various wireless communication methods. It is noted that embodiments of the present disclosure may operate in conjunction with any suitable type of network, such as an interactive television (ITV) network.

The system may be partially or fully implemented using cloud computing. "Cloud" or "Cloud computing" includes a model for enabling convenient, on-demand network access to a shared pool of configurable computing resources (e.g., networks, servers, storage, applications, and services) that can be rapidly provisioned and released with minimal management effort or service provider interaction. Cloud computing may include location-independent computing, whereby shared servers provide resources, software, and data to computers and other devices on demand.

Various embodiments may be used in conjunction with web services, utility computing, pervasive and individualized computing, security and identity solutions, autonomic computing, cloud computing, commodity computing, mobility and wireless solutions, open source, biometrics, grid computing and/or mesh computing.

Any databases discussed herein may include relational, hierarchical, graphical, or object-oriented structure and/or any other database configurations. Moreover, the databases may be organized in any suitable manner, for example, as data tables or lookup tables. Each record may be a single file, a series of files, a linked series of data fields or any other data structure. Association of certain data may be accomplished through any desired data association technique such as those known or practiced in the art. For example, the association may be accomplished either manually or automatically.

Any databases, systems, devices, servers or other components of the system may be located at a single location or at multiple locations, wherein each database or system includes any of various suitable security features, such as firewalls, access codes, encryption, decryption, compression, decompression, and/or the like.

Encryption may be performed by way of any of the techniques now available in the art or which may become available—e.g., Twofish, RSA, El Gamal, Schorr signature, DSA, PGP, PKI, and symmetric and asymmetric cryptosystems.

Embodiments may connect to the Internet or an intranet using standard dial-up, cable, DSL or any other Internet protocol known in the art. Transactions may pass through a firewall in order to prevent unauthorized access from users of other networks.

The computers discussed herein may provide a suitable website or other Internet-based graphical user interface which is accessible by users. For example, the Microsoft Internet Information Server (IIS), Microsoft Transaction Server (MTS), and Microsoft SQL Server, may be used in conjunction with the Microsoft operating system, Microsoft NT web server software, a Microsoft SQL Server database system, and a Microsoft Commerce Server. Additionally, components such as Access or Microsoft SQL Server, Oracle, Sybase, Informix MySQL, Interbase, etc., may be used to provide an Active Data Object (ADO) compliant database management system. In another example, an Apache web server can be used in conjunction with a Linux operating system, a MySQL database, and the Perl, PHP, and/or Python programming languages.

Any of the communications, inputs, storage, databases or displays discussed herein may be facilitated through a website having web pages. The term "web page" as it is used herein is not meant to limit the type of documents and applications that might be used to interact with the user. For example, a typical website might include, in addition to standard HTML documents, various forms, Java applets, JavaScript, active server pages (ASP), common gateway interface scripts (CGI), extensible markup language (XML), dynamic HTML, cascading style sheets (CSS), AJAX (Asynchronous Javascript And XML), helper applications, plug-ins, and the like. A server may include a web service that receives a request from a web server, the request including a URL and an IP address. The web server retrieves the appropriate web pages and sends the data or applications for the web pages to the IP address. Web services are applications that are capable of interacting with other applications over a communications means, such as the Internet.

Various embodiments may employ any desired number of methods for displaying data within a browser-based document. For example, data may be represented as standard text or within a fixed list, scrollable list, drop-down list, editable text field, fixed text field, pop-up window, and the like. Likewise, embodiments may utilize any desired number of methods for modifying data in a web page such as, for example, free text entry using a keyboard, selection of menu items, check boxes, option boxes, and the like.

The exemplary systems and methods illustrated herein may be described in terms of functional block components, screen shots, optional selections and various processing steps. It should be appreciated that such functional blocks may be realized by any number of hardware and/or software components configured to perform the specified functions. For example, the system may employ various integrated circuit components, e.g., memory elements, processing elements, logic elements, look-up tables, and the like, which may carry out a variety of functions under the control of one or more microprocessors or other control devices. Similarly, the software elements of the system may be implemented with any programming or scripting language such as C, C++, C#, Java, JavaScript, VBScript, Macromedia Cold Fusion, COBOL, Microsoft Active Server Pages, assembly, PERL, PHP, AWK, Python, Visual Basic, SQL Stored Procedures, PL/SQL, any UNIX shell script, and extensible markup language (XML) with the various algorithms being implemented with any combination of data structures, objects, processes, routines or other programming elements. Further, it should be noted that the system may employ any number of conventional techniques for data transmission, signaling, data processing, network control, and the like. Still further, the system could be used to detect or prevent security issues with a client-side scripting language, such as JavaScript, VBScript or the like.

The systems and methods of the present disclosure may be embodied as a customization of an existing system, an add-on product, a processing apparatus executing upgraded software, a stand alone system, a distributed system, a method, a data processing system, a device for data processing, and/or a computer program product. Accordingly, any portion of the system or a module may take the form of a processing apparatus executing code, an internet based embodiment, an entirely hardware embodiment, or an embodiment combining aspects of the internet, software and hardware. Furthermore, the system may take the form of a computer program product on a computer-readable storage medium having computer-readable program code means embodied in the storage medium. Any suitable computer-readable storage medium may be utilized, including hard disks, CD-ROM, optical storage devices, magnetic storage devices, and/or the like.

The system and method is described herein with reference to screen shots, block diagrams and flowchart illustrations of methods, apparatus (e.g., systems), and computer program products according to various embodiments. It will be understood that each functional block of the block diagrams and the flowchart illustrations, and combinations of functional blocks in the block diagrams and flowchart illustrations, respectively, can be implemented by computer program instructions.

These computer program instructions may be loaded onto a general purpose computer, special purpose computer, or other programmable data processing apparatus to produce a machine, such that the instructions that execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions. Further, illustrations of the process flows and the descriptions thereof may make reference to user windows, webpages, websites, web forms, prompts, etc. Practitioners will appreciate that the illustrated steps described herein may comprise in any number of configurations including the use of windows, webpages, web forms, popup windows, prompts and the like. It should be further appreciated that the multiple steps as illustrated and described may be combined into single webpages and/or windows but have been expanded for the sake of simplicity. In other cases, steps illustrated and described as single process steps may be separated into multiple webpages and/or windows but have been combined for simplicity.

The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" should be construed to exclude only those types of transitory computer-readable media which were found in In Re Nuijten to fall outside the scope of patentable subject matter under 35 U.S.C. §101.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the disclosure.

Although the disclosure includes a method, it is contemplated that it may be embodied as computer program instructions on a tangible computer-readable carrier, such as a magnetic or optical memory or a magnetic or optical disk. All structural, chemical, and functional equivalents to the elements of the above-described exemplary embodiments that are known to those of ordinary skill in the art are expressly incorporated herein by reference and are intended to be encompassed by the present claims. Moreover, it is not necessary for a device or method to address each and every problem sought to be solved by the present disclosure, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

Where a phrase similar to "at least one of A, B, or C," "at least one of A, B, and C," "one or more A, B, or C," or "one or more of A, B, and C" is used, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Changes and modifications may be made to the disclosed embodiments without departing from the scope of the present disclosure. These and other changes or modifications are intended to be included within the scope of the present disclosure, as expressed in the following claims.

What is claimed is:

1. A method, comprising:
during a training phase, generating a pattern for one or more patterns associated with non-modified web page states, the pattern based on a state report received from a training machine, wherein the state report comprises an adequate header and is received from an expected IP address;
transmitting, by a server computing device to a client computing device over a network, a code module for collecting and transmitting data related to a web page presented on the client computing device;
receiving, by the server computing device, the data related to the web page presented on the client computing device, wherein the data related to the web page is received over the network via the code module operating on the client computing device, wherein the data related to the web page comprises elements that request a user of the client computing device to enter data, and wherein the elements are mapped to a representation in a form of a tree structure containing details of input fields nested inside details of a form element;
analyzing, by the server computing device, the data related to the web page, wherein analyzing the data related to the web page includes comparing the data to one or more of:
the one or more patterns associated with non-modified web page states;
one or more patterns associated with malicious web page states; or
one or more patterns associated with innocuous web page modifications;
in response to the analyzing, generating a risk factor associated with the web page;
in response to identifying the web page as a potential risk, classifying the web page into a first classification of a plurality of classifications, wherein the identifying is based on the elements mapped to the representation in the form of the tree structure;
after classifying the web page into the first classification, generating a first pattern associated with the first classification, the first pattern comprising a modification of the web page performed by malware;
providing a label identifying the modification of the web page, the label comprising an identifier of the malware performing the modification;
generating updated patterns by training using the first pattern and the one or more patterns associated with the malicious web page states; and
analyzing data related to a second web page presented on the client computing device, wherein analyzing the data related to the second web page includes comparing the data to the updated patterns.

2. The method of claim 1, wherein transmitting the code module includes embedding the code module into the web page.

3. The method of claim 2, wherein embedding the code module into the web page includes inserting a loader module into the web page and executing the loader module to embed the code module into the web page.

4. The method of claim 1, wherein the data related to the web page includes a subset of the total elements present in the web page.

5. The method of claim 1, wherein the data related to the web page further includes one or more of: an identifier, a styling detail, a location of an element within the web page, or a script element.

6. The method of claim 5, further comprising configuring the code module, by the server computing device and prior to transmission to the client computing device, to retrieve the data related to the web page based on one or more selected page elements.

7. The method of claim 6, wherein the one or more selected page elements include one or more editable elements.

8. The method of claim 6, wherein the one or more selected page elements include a script tag.

9. The method of claim 1, wherein generating the risk factor associated with the web page includes performing a risk-assessment algorithm.

10. The method of claim 9, wherein the risk-assessment algorithm is only performed in response to a determination by analyzing the data related to the web page that one or more elements in the data related to the web page does not correspond to any pattern in: the one or more patterns associated with non-modified web page states, the one or more patterns associated with malicious web page states, and the one or more patterns associated with innocuous web page modifications.

11. The method of claim 10, further comprising updating, based on performance of the risk-assessment algorithm, a pattern in one or more of: the one or more patterns associated with non-modified web page states, the one or more patterns associated with malicious web page states, or the one or more patterns associated with innocuous web page modifications.

12. The method of claim 1, further comprising generating, for the one or more patterns associated with non-modified web page states, a pattern associated with a new version of a web page.

13. The method of claim 1, further comprising generating a pattern for the one or more patterns associated with malicious web page states.

14. The method of claim 13, wherein generating the pattern for the one or more patterns associated with malicious web page states includes generating a pattern associated with malware performing an injection to a web page.

15. The method of claim 1, further comprising generating a pattern for the one or more patterns associated with innocuous web page modifications.

16. The method of claim 15, wherein generating the pattern for the one or more patterns associated with innocuous web page modifications includes generating a pattern associated with one or more of an extension or a plug-in for a web page.

17. The method of claim 1, further comprising generating an alert associated with the web page in response to the risk factor meeting or exceeding a predetermined threshold.

18. A system, comprising:
a processor; and
memory coupled to the processor and storing instructions that, when executed by the processor, cause the system to:
during a training phase, generate a pattern for one or more patterns associated with non-modified web page states, the pattern based on a state report received from a training machine, wherein the state report comprises an adequate header and is received from an expected IP address;
transmit, to a client computing device over a network, a code module for collecting and transmitting data related to a web page presented on the client computing device;

receive the data related to the web page presented on the client computing device, wherein the data related to the web page is received over the network via the code module operating on the client computing device, wherein the data related to the web page comprises elements that request a user of the client computing device to enter data, and wherein the elements are mapped to a representation in a form of a tree structure containing details of input fields nested inside a form element;

analyze the data related to the web page, wherein analyzing the data related to the web page includes comparing the data to one or more of:
   the one or more patterns associated with non-modified web page states;
   one or more patterns associated with malicious web page states; or
   one or more patterns associated with innocuous web page modifications;

in response to the analyzing, generate a risk factor associated with the web page;

in response to identifying the web page as a potential risk, classify the web page into a first classification of a plurality of classifications, wherein the identifying is based on the elements mapped to the representation in the form of the tree structure;

after classifying the web page into the first classification, generate a first pattern associated with the first classification, the first pattern comprising a modification of the web page performed by malware;

provide a label identifying the modification of the web page, the label comprising an identifier of the malware performing the modification;

generate updated patterns by training using the first pattern and the one or more patterns associated with the malicious web page states; and analyze data related to a second web page presented on the client computing device, wherein analyzing the data related to the second web page includes comparing the data to the updated patterns.

19. A tangible, non-transitory computer-readable medium storing instructions that, when executed by a server computing device, cause the server computing device to:

during a training phase, generate a pattern for one or more patterns associated with non-modified web page states, the pattern based on a state report received from a training machine, wherein the state report comprises an adequate header and is received from an expected IP address;

transmit, to a client computing device over a network, a code module for collecting and transmitting data related to a web page presented on the client computing device;

receive the data related to the web page presented on the client computing device, wherein the data related to the web page is received over the network via the code module operating on the client computing device, wherein the data related to the web page comprises elements mapped to a representation in a form of a tree structure containing details of input fields nested inside a form element;

analyze the data related to the web page, wherein analyzing the data related to the web page includes comparing the data to one or more of:
   the one or more patterns associated with non-modified web page states;
   one or more patterns associated with malicious web page states; or
   one or more patterns associated with innocuous web page modifications;

in response to the analyzing, generate a risk factor associated with the web page;

in response to identifying the web page as a potential risk, classify the web page into a first classification of a plurality of classifications, wherein the identifying is based on the elements mapped to the representation in the form of the tree structure:

after classifying the web page into the first classification, generate a first pattern associated with the first classification, the first pattern comprising a modification of the web page performed by malware;

generate updated patterns by training using the first pattern; and analyze data related to a second web page presented on the client computing device, wherein analyzing the data related to the second web page includes comparing the data to the updated patterns.

* * * * *